United States Patent [19]
Lee

[11] Patent Number: 5,796,896
[45] Date of Patent: Aug. 18, 1998

[54] MULTI-FERRULE FIBER OPTIC CONNECTOR FOR HIGH DENSITY BACKPLANE APPLICATIONS

[75] Inventor: Nicholas A. Lee, Woodbury, Minn.

[73] Assignee: Minnesota Mining and Manufacturing Company, St. Paul, Minn.

[21] Appl. No.: 615,374

[22] Filed: Mar. 14, 1996

[51] Int. Cl.$^6$ ................................................ G02B 6/38
[52] U.S. Cl. ............................ 385/59; 385/60; 385/71; 385/72
[58] Field of Search ........................ 385/59, 71, 53, 385/54, 55, 56, 60, 72

[56] References Cited

U.S. PATENT DOCUMENTS

| | | | |
|---|---|---|---|
| 4,070,081 | 1/1978 | Takahashi | 339/91 R |
| 4,076,204 | 2/1978 | Kalka | 248/500 |
| 4,944,568 | 7/1990 | Danbach et al. | 350/96.2 |
| 5,325,455 | 6/1994 | Henson et al. | 385/89 |
| 5,542,015 | 7/1996 | Hultermans | 385/56 X |

*Primary Examiner*—Phan T. H. Palmer
*Attorney, Agent, or Firm*—Gary L. Griswold; Walter N. Kirn; H. Sanders Gwin, Jr.

[57] ABSTRACT

A high-density optical fiber connector in which a plurality of ferrules containing the terminal ends of optical fibers are individually sprung and axially and transversely free to provide improved interconnection reliability. The present invention is a three component fiber optic connector for high density interconnection environments. The first component, a first male connector member, will typically be mounted on an edge of a generally planar substrate such as, for example, a circuit board, and includes a plurality of independently sprung, axially and transversely free optical fiber ferrules. The second component, a second male connector member, also includes a plurality of independently sprung, axially transversely free optical fiber ferrules. The third component, a coupling member, receives and couples together the first and second male members. The coupling member includes bores which align the ferrules from the first and second male connector members and provide optical interconnection between the optical fibers in the first and second male connector members. The coupling member further includes latching members which engage the second male connector part, while the first male connector part is retained by appropriate latching features on the circuit board. This simplifies the removal of the connector assembly from the circuit board and provides enhanced interconnection reliability.

13 Claims, 2 Drawing Sheets

MULTI-FERRULE FIBER OPTIC CONNECTOR FOR HIGH DENSITY BACKPLANE APPLICATIONS

BACKGROUND OF THE INVENTION

1. Field of the Invention

The present invention generally relates to devices for interconnecting multiple optical fibers. More particularly, the present invention relates to a highdensity optical fiber connector for connecting multiple optical fibers to an optoelectronic component near the edge of a planar substrate, such as a circuit card. Even more particularly, the present invention relates to a high-density optical fiber connector in which a plurality of ferrules containing the terminal ends of optical fibers are individually sprung and axially and transversely free to provide improved interconnection reliability.

2. Description of Related Art

The use of optical fibers for high speed communication and data transmission via optical signals has become well established. Modern telecommunications systems employ numerous optical fiber signal transmission lines and it is necessary to provide connections between the optical fibers at various locations within these systems. As used herein, the term "connector" refers to a detachable and re-fastenable connection, as opposed to a "splice" which usually connotes a permanent connection.

There are many conventional fiber optic connector designs, including those commonly referred to under trade designations such as ST, SC, FC, D4, SMA, and biconic connectors. All of these designs are simplex, i.e., they are used to connect a single pair of optical fibers. One need that has not been met by these connectors is the demand for an efficient mass connection system for a highdensity environment, particularly for a data processing system, such as a mainframe computer or a telecommunications switching system. Simplex connectors are simply too large to provide sufficient interconnection density and they are inconvenient and time consuming when connecting or disconnecting large numbers of optical fibers.

Multifiber connectors which provide higher interconnection density and more convenient multifiber connection and disconnection have been developed, the most prevalent being the device sold by USConec under the trade designation MT. Referring to FIG. 1, the MT connector 10 consists of a multifiber, monolithic ferrule I which utilizes a pair of precise alignment pins 2 to coaxially align a plurality of fibers 3, which pass through the ferrule 1, and whose end faces 4 are polished flush with the front face 5 of the ferrule 1. Although the MT connector addresses the issues of density and convenience, it does so at the cost of optical performance. Since all of the optical fibers in the MT connector are mounted in the same ferrule, they cannot be individually axially and transversely aligned like the ferrules and optical fibers in a simplex connector design. For at least this reason, the optical performance of the MT style connector will tend to be poorer than that of the known simplex connectors.

Another multi-fiber, high density optical fiber connection device is described in U.S. Pat. No. 5,325,455 to Henson et al. The connector described in the '455 patent comprises a transceiver housing, a plug member, and a connection frame. The housing, which contains optoelectronic components, is mounted to the edge of a circuit card in a high density interconnection environment such as, for example, at the back of a computer. The housing includes an alignment block with a plurality of holes. The plug member, which includes splined side walls, provides a plurality of protruding, rigidly mounted ferrules which contain the terminal ends of optical fibers. The frame, which attaches with screws to a support bar adjacent the edge of the circuit card, provides grooved walls to accept the splines of the plug. When the plug is inserted into the frame, the protruding ferrules engage the holes in the alignment block on the housing, and optical interconnection is achieved. FIG. 9 of the '455 patent illustrates that the frame may be adapted for fiber-to-fiber interconnection by including a suitably configured boss or block to receive the protruding ferrules in each of a pair of plug members and provide an optical interconnection. As with the MT-style connector described above, the connection device in the '455 patent requires that the protruding ferrules engage the alignment holes or block precisely, and includes no means for axial or transverse alignment of individual ferrules. The design in FIG. 9 of the '455 patent also provides no coarse, pre-alignment path prior to the insertion of the protruding ferrules into the holes of the alignment block, so insertion under demanding conditions without ferrule damage would be expected to be difficult.

It would, therefore, be desirable to devise a multifiber connector which possesses high interconnection density and convenience, as in the MT type connector, while maintaining the fiber-by-fiber alignment performance of a simplex connector.

SUMMARY OF THE INVENTION

The present invention comprises a three component fiber optic connector for high density interconnection environments.

The first component, a first male connector member, has a longitudinal bore extending from a first end to a second end thereof In the bore resides a ferrule retaining member which includes a plurality of ferrule retention bores generally axially aligned with the longitudinal bore. In each ferrule retention bore resides an alignment spring member and a ferrule. The ferrule has a first end and a second end, and the second end terminates an optical fiber. Each ferrule in the ferrule retaining member is independently sprung, i.e., free to axially and transversely move in the first ferrule retaining member independent of another ferrule therein. Unlike conventional multi-fiber connectors, the independent springing of each optical connection in the present invention increases the reliability and robustness of the connector as a whole.

The first male connector member typically will be mounted on an edge of a generally planar substrate such as a card or a circuit board. The circuit board may be mounted in or attached to any electronic device, such as, for example, at the back of a computer, and may include optional mounting structures for board attachment. The first male connector member is thus held in position through connection to the board, rather than by connection to the other portions of the connector. This design allows the connector to be connected and disconnected with the board, rather than as a separate step. Thus, when a latching feature on the circuit board is released, the first male connector member can be removed from the remainder of the connector without additional steps.

The bore in the first male connector body is preferably made sufficiently long such that the second ends of the ferrules are inside the body, which protects the ferrules from inadvertent mechanical damage during engagement operations or when the first male connector member is disengaged from the other members of the connector, and prevents board failure. The length of the first male body also provides pre-alignment of the first male connector body and the other portions of the connector.

The second component, a second male connector member, also includes a longitudinal bore extending from a first end to a second end thereof In the bore resides a second ferrule retaining member which includes a plurality of ferrule retention bores generally axially aligned with the longitudinal bore. In each ferrule retention bore resides an alignment spring member and a ferrule. The ferrule has a first end and a second end, and the second end terminates an optical fiber. Each ferrule in the ferrule retaining member is also independently sprung, i.e., free to axially and transversely move in the second ferrule retaining member independent of another ferrule therein.

The third component, a female coupling body, includes a first end adapted to slideably engage the first end of the first male connector member, a second end adapted to slideably engage the first end of the second male connector body, and a coupling bore extending from the first end to the second end. The coupling body further includes a ferrule coupling member in the coupling bore and attached to the coupling body.

The ferrule coupling member comprises a plurality of ferrule alignment bores generally axially aligned with the coupling bore and having a first end adapted to slideably engage the second ends of the ferrules in the first body and a second end adapted to slideably engage the second ends of the ferrules in the second body. The ferrule alignment bores preferably include bushings which permit each ferrule to align both axially and transversely in the ferrule coupling member relative to an opposing ferrule and independent of the other adjacent ferrules therein.

The coupling bore in the female coupling body is preferably made sufficiently long to provide pre-alignment of the second ends of the ferrules in the first and second male connector bodies with the ferrule alignment bores in the ferrule coupling member in the coupling body. This simplifies insertion of multiple ferrules into the ferrule coupling member and reduces the likelihood of ferrule or fiber damage during insertion or disengagement.

The connector of the present invention further includes a latching member, attached to the female coupling body, which releasably engages the second male connector body. However, the female coupling body does not include features which would allow it to be releasably attached to the first male connector member. This allows the first male connector member to be easily inserted into the female coupling body and retained there by the latching features on the circuit board.

The connector of the present invention thus provides a low profile multifiber connector which possesses high interconnection density, while maintaining the fiber-by-fiber alignment performance of a simplex connector. The connector provides a robust, reliable system which maintains optical connection in demanding end use environments.

DETAILED DESCRIPTION OF THE INVENTION

Figure 3:
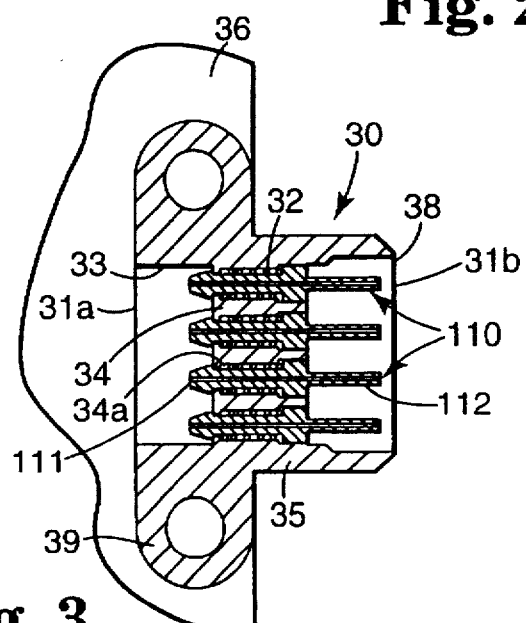
FIG. 3 is a cross-sectional view of the first male connector member of the present invention attached to the edge of a planar substrate.

Referring to FIG. 3, a cross-sectional view of an embodiment of the first male connector member of the present invention, a board-mount housing 30, is shown. A first end 31a of the housing 30 is attached to an edge of a planar substrate 36, such as a circuit board, via a mounting structure 39. The board-mount housing body 35 includes a longitudinal bore 33 from the first end 31a thereof to a second end 31b. A ferrule retaining member 34 placed generally diametrically across the bore 33 includes a plurality of ferrule retention bores 34a which are designed to capture a plurality of ferrules 110.

The ferrules 110 include a first end 111 and a second optical end 112, with the optical end 112 terminating an optical fiber (not shown). The ferrule retention bores 34a further include compression spring members, preferably helical springs 32, such that each ferrule 110 is free to align both axially and transversely relative to an opposing ferrule (not shown) and independent of other ferrules 110 within the ferrule retaining member 34. It is preferable that the board-mount housing body 35 be sufficiently long such that the ferrules 110 remain inside the bore 33. This allows the front edge 38 of the board-mount housing body 35 to extend beyond the optical ends 112 of the ferrules 110, thus protecting them from inadvertent mechanical damage during handling.

Figure 1:
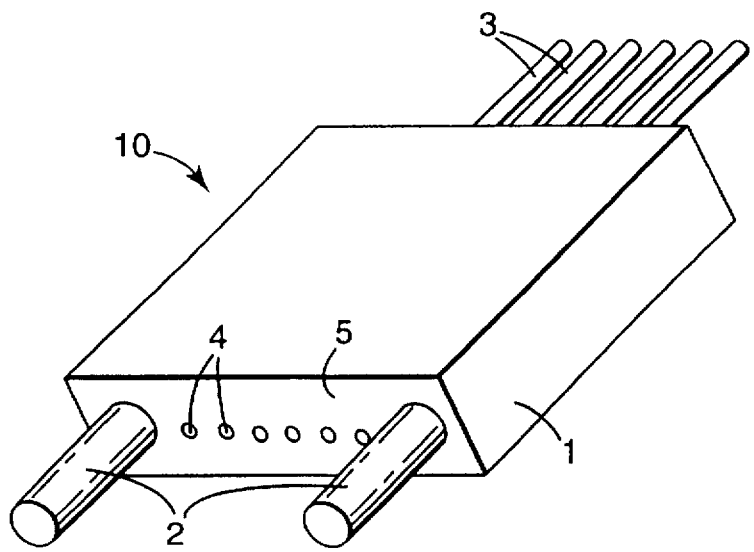
FIG. 1 is a perspective view of a conventional multifiber optical connector.
Figure 2:
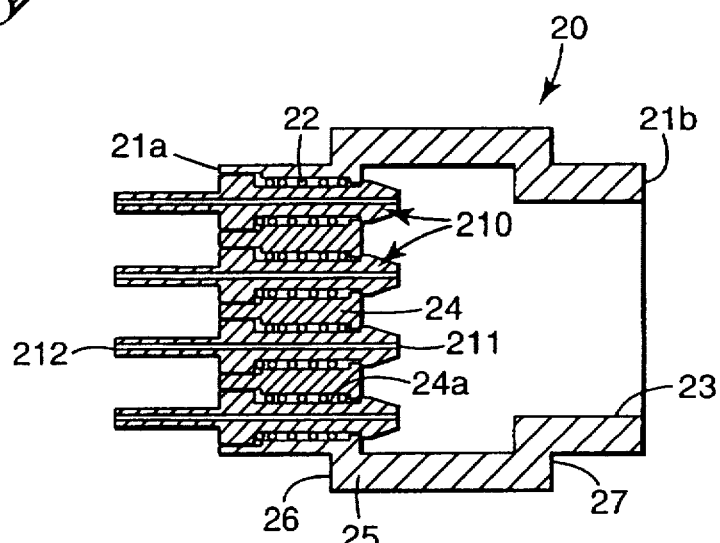
FIG. 2 is a cross-sectional view of the second male connector member of the present invention.

In FIG. 2, a cross-sectional view of an embodiment of a second male connector member of the present invention, a connector plug 20, is shown. The connector plug body 25 includes a longitudinal bore 23 from the first end 21a thereof to a second end 21b. A ferrule retaining member 24 placed generally diametrically across the bore 23 includes a plurality of ferrule retention bores 24a which are designed to capture a plurality of ferrules 210.

The ferrules 210 include a first end 211 and a second optical end 212, with the second end 212 terminating an optical fiber (not shown). The ferrule retention bores 24a further include compression spring members, preferably helical springs 22, such that each ferrule 210 is free to align both axially and transversely relative to an opposing ferrule (not shown) and independent of other ferrules 210 within the ferrule retaining member 24. In addition, the connector plug body 25 contains front shoulders 26 and rear shoulders 27 which allow it to be releasably secured to the female coupling member (not shown in FIG. 2, see FIGS. 4–5 below).

Figure 4:
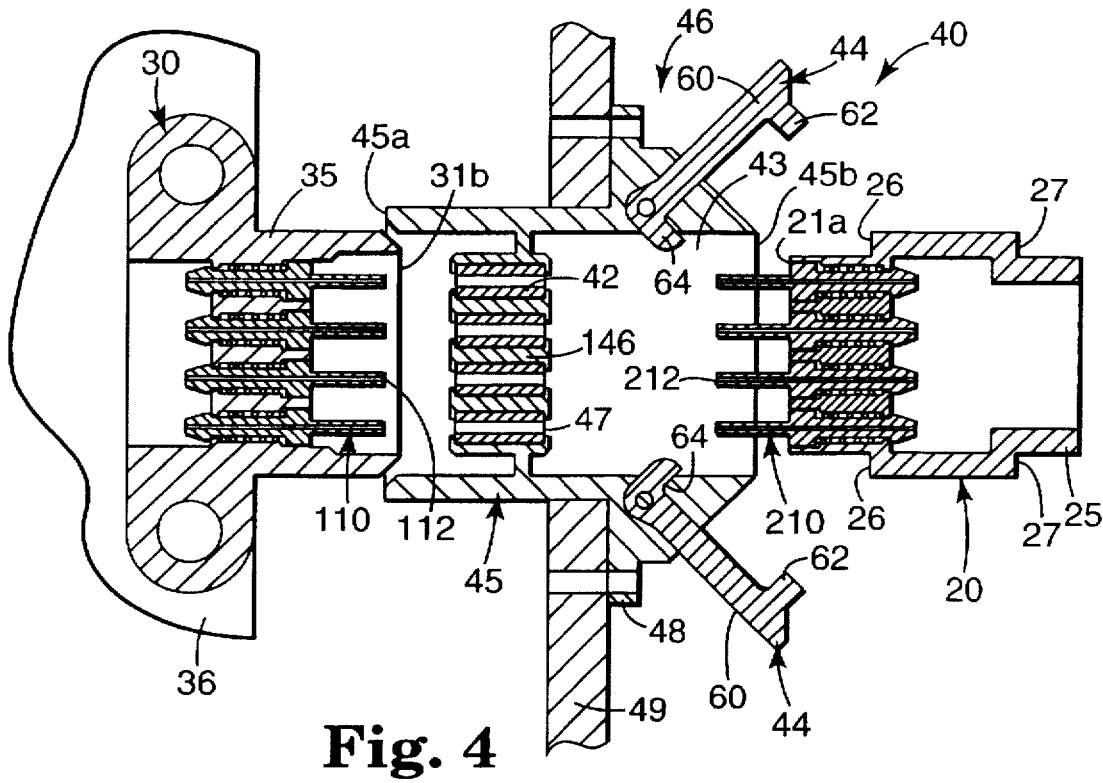
FIG. 4 is a cross-sectional view of the connector of the present invention in the unconnected state.

In FIG. 4, a cross-sectional view of the connector 40 of the present invention in the unconnected state is shown. A coupling 46 is comprised of a female coupling body 45 which includes a longitudinal bore 43 from a first end 45a to a second end 45b thereof. The first end 45a of the female coupling body 45 is adapted to slideably engage the second end 31b of the board-mount housing 30, while the second end 45b of the female coupling body 45 is adapted to slideably engage the first end 21a of the connector plug 20.

The coupling body 45 includes a ferrule coupling member 146 generally diametrically across the bore 43. The coupling member 146 contains a plurality of ferrule alignment bores 47 adapted to slideably engage the optical ends 112 of the ferrules 110 in the housing 30. The alignment bores 47 are also adapted to slideably engage the optical ends 212 of the ferrules 210 in the connector plug 20, such that the ends 112 and 212 abut one another and provide an optical interconnection between the ferrules 110 and the ferrules 210. A bushing 42 may be located in each of the ferrule alignment bores 47 to independently axially and transversely align each opposed pair of ferrules 110 and 210. The bore 43 and the female coupling body 45 are preferably sufficiently long to provide pre-alignment of the ferrules 110 in the housing 30 and the ferrules 210 in the connector plug 20 with the ferrule retention bores 47 in the ferrule alignment member 146 during mating of the parts of the connector.

In addition, the coupling body 45 contains latching features 44 which allow it to be releasably attached to the connector plug 20. However, the coupling 46 does not contain latching features which would allow it to be releasably attached to the board-mount housing 30. This allows the board-mount housing 30 to be easily inserted into the coupling body 45 and retained there by latching features (not shown) on the planar substrate 36. Thus, when the latching features (not shown) on the planar substrate 36 are released, the board-mount housing 30 can be removed from the female coupling body 45 without additional steps. Further, the coupling body 45 contains features 48 which allow the coupling body 45 to be attached to an axially perpendicular generally planar substrate 49.

The latching member 44 may have many differing configurations depending on the intended application, but an "electrical-style" latching system such as described in U.S. Pat. No. 4,070,081 to Takahashi or a retaining clip such as described in U.S. Pat. No. 4,076,204 to Kalka are preferred.

Figure 5:
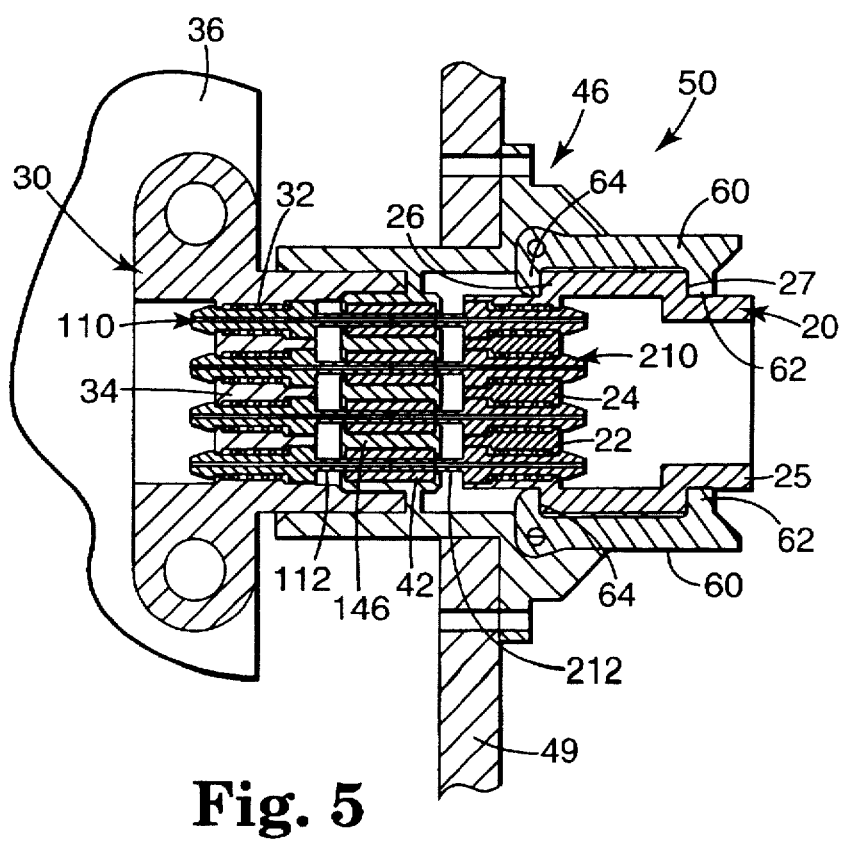
FIG. 5 is a cross-sectional view of the connector of the present invention in the connected state.

In a preferred embodiment shown in FIGS. 4-5, the latching member includes opposed levers 60 pivotally mounted on the female coupling body 45. The opposed levers 60 are rotatable in opposite directions, and include engaging tabs 62 at an upper inner surface thereof which engage the rear shoulders 27 on the connector plug body 25 to securely lock together the female coupling body 45 and the connector plug 20. The opposed levers 60 further comprise a lifting arm 64 at their lower ends. Rotation of the lever arms 60 causes the lifting arms to act on the front shoulders 26 on the connector plug body 25, which pushes the connector plug 20 away from the female coupling body 45 and disengages the plug 20 from the body 45. This "camming action" provides a mechanical advantage which is particularly important when multiple optical fiber ferrules must be disengaged from the ferrule coupling member 146.

In FIG. 5, a cross-sectional view of the connector 50 of the present invention in the connected state is shown. The optical ends 112 of the ferrules 110 in the housing 30 are engaged in the bushings 42 of the ferrule alignment bores in the ferrule alignment member 146 in an opposed fashion with the optical ends 212 of the ferrules 210 in the connector plug 20. Each pair of opposed ferrules 110 and 210 is aligned independently in both the axial and transverse directions within a bushing 42. The connector plug 20 is releasably attached to the female coupling body 45 by the latching arms 60. The tabs 62 engage the rear shoulders 27 on the connector plug body 25 and the lifting arms 64 engage the front shoulders 26 on the connector plug body 25.

It will be understood that the exemplary embodiments described herein in no way limit the scope of the invention. Other modifications of the invention will be apparent to those skilled in the art in view of the foregoing description. These descriptions are intended to provide specific examples of embodiments which clearly disclose the present invention. Accordingly, the invention is not limited to the described embodiments or to the use of the specific elements, dimensions, materials or configurations contained therein. All alternative modifications and variations which fall within the spirit and scope of the appended claims are included in the present invention.

What is claimed is:

1. A connector for high-density optical fiber interconnection, comprising:

(a) a first male connector body with a first end comprising a mounting structure for attachment of the first connector body to a generally planar substrate, a second end, and a first bore between the first and second ends, a first ferrule retaining member attached to said first body and positioned generally diametrically across said first bore, said first ferrule retaining member comprising a plurality of ferrule retention bores which are generally axially aligned with the first bore, a helical spring and a ferrule in each ferrule retention bore of the first ferrule retaining member, wherein each ferrule comprises a first end proximal the first end of the first body and a second end proximal the second end of the first body, and wherein each ferrule is free to axially and transversely move in the first ferrule retaining member independent of another ferrule therein;

(b) a second male connector body with a first end, a second end, and a second bore between the first end and the second end, wherein an external surface of the second connector body comprises a first shoulder structure proximal the first end of the second connector body and a second shoulder structure proximal the second end of the second connector body, a second ferrule retaining member attached to said second body and proximal the first end of said second connector body, wherein said ferrule retaining member is positioned generally diametrically across said second bore, said ferrule retaining member comprising a plurality of ferrule retention bores which are generally axially aligned with the second bore, a helical spring and a ferrule in each ferrule retention bore in the second ferrule retaining member, wherein each ferrule comprises a first end proximal the second end of the second body and a second end proximal the first end of the second body, wherein each ferrule is free to axially and transversely move in the second ferrule retaining member independent of another ferrule therein;

(c) a female coupling body with a first end slideably engaging the second end of the first male connector body, a second end slideably engaging the first end of the second male connector body, and a coupling bore between the first end and the second end, said coupling body further comprising a ferrule coupling member generally diametrically across said coupling bore and attached to the coupling body, wherein said ferrule coupling member comprises a plurality of ferrule alignment bores generally axially aligned with the coupling bore and having a first end engaging the second end of the ferrules in the first male connector body and a second end engaging the second end of the ferrules in the second male connector body such that the second ends of the ferrules in the first male connector body abut the second ends of the ferrules in the second male connector body and provide optical interconnection therebetween, and a latching member pivotally mounted on said female coupling body, wherein said latching member releasably engages the shoulder structures on the second male connector body.

2. A connector as claimed in claim 1, wherein said female coupling member further comprises a first side wall and a second side wall generally parallel to the first side wall, and said latching means comprises a first lever pivotally mounted on the first side wall and a second lever pivotally mounted on the second side wall, wherein said first and second levers are adapted to engage the second shoulder on the second male connector body.

3. A connector as claimed in claim 2, wherein said first and second levers are rotatable in opposite directions, said first and second levers further comprising engaging tabs at an upper inner surface thereof, said engaging tabs engaging the second shoulder on the second male connector body to lock together the female coupling member and the second male connector body.

4. A connector as claimed in claim 3, wherein said first and second levers further comprise a lifting arm at the lower ends thereof, wherein said lifting arms engage the first shoulder structure on the second male connector body, and rotation of the lever arms causes the second male connector body to move away from the female coupling member.

5. A connector as claimed in claim 1, wherein the female coupling body is sufficiently long to provide pre-alignment of the second ends of the ferrules in the first and second male connector bodies with the ferrule alignment bores in the ferrule coupling member in the coupling body.

6. A connector as claimed in claim 1, wherein said coupling body further comprises mounting structures for attachment of said coupling body to a generally planar member oriented generally normal to the coupling bore.

7. A connector as claimed in claim 1, wherein the ferrule alignment bores further comprise bushings.

8. A connector as claimed in claim 1, wherein the second ends of the ferrules in the first body are inside the first body.

9. A high-density optical fiber connector, comprising:
 (a) a board-mount housing with a first end comprising a mounting tab for attachment of the first connector body to an edge of a circuit board, a second end, and a first bore between the first and second ends,
 a first ferrule mount attached to said housing and positioned generally diametrically across said first bore, said ferrule mount comprising a plurality of passages which are generally axially aligned with the first bore,
 a helical spring and a ferrule in each passage of the first ferrule mount, wherein each ferrule comprises a first end proximal the first end of the housing, and a second end proximal the second end of the housing, wherein the second end of each ferrule in the first ferrule mount terminates an optical fiber, and wherein each ferrule in the first ferrule mount is free to move axially and transversely in the first ferrule mount independent of another ferrule therein, and wherein the second ends of the ferrules in the first ferrule mount are inside the housing;
 (b) a connector plug with a first end, a second end, and a second bore between the first end and the second end, wherein an external surface of the connector plug comprises a first shoulder structure proximal the first end of the plug and a second shoulder structure proximal the second end of the plug,
 a second ferrule mount attached to the connector plug and proximal the first end thereof, wherein said second ferrule mount is positioned generally diametrically across said second bore, said second ferrule mount comprising a plurality of passages which are generally axially aligned with the second bore,
 a helical spring and a ferrule in each passage in the second ferrule mount, wherein each ferrule comprises a first end proximal the second end of the connector plug, and a second end proximal the first end of the connector plug, wherein the second end of each ferrule terminates an optical fiber, and wherein said second end of said ferrules in the second ferrule mount extends outwardly from the second bore and wherein each ferrule in the second ferrule mount is free to move axially and transversely independent of the another ferrule therein;
 (c) a coupler with first wall and a second wall generally parallel to the first wall, a first end adapted to slideably engage the second end of the housing, a second end adapted to slideably engage the first end of the connector plug, and a coupling bore between the first end and the second end thereof, said coupler further comprising a ferrule coupling member generally diametrically across said coupling bore and attached to the coupler, wherein said ferrule coupling member comprises a plurality of ferrule alignment bores generally axially aligned with the coupling bore and having a first end adapted to slideably engage the second end of the ferrules in the housing and a second end adapted to slideably engage the second end of the ferrules in the connector plug, wherein the coupling bore in the coupler is sufficiently long to provide pre-alignment of the second ends of the ferrules in the housing and the connector plug with the ferrule alignment bores in the ferrule coupling member, and
 a latching member attached to said coupler, wherein said latching member comprises a first lever pivotally mounted on the first side wall of the coupler and a second lever pivotally on the second side wall of the coupler, wherein said first and second levers are rotatable in opposite directions, said first and second levers further comprising engaging tabs at an upper inner surface thereof to engage the second shoulder on the connector plug to lock together the coupler and the connector plug, said first and second levers further comprising a lifting arm at the lower ends thereof, wherein rotation of the lever arms causes the lifting arms to act on the first shoulder structure on the connector plug and disengage the connector plug from the coupler.

10. A connector as claimed in claim 9, further comprising a bushing in each ferrule alignment bore.

11. An optical connector comprising:
 (a) a first connector part having a plurality of optical fiber ferrule members, wherein each said ferrule member is free to move axially and transversely independent of the other ferrule members, said first connector part including mounting means for attaching said first connector part to a generally planar substrate;
 (b) a second connector part having a plurality of optical fiber ferrule members, wherein each ferrule member is free to move axially and transversely independent of the other ferrule members; and
 (c) a coupling part having a plurality of ferrule alignment means for axially and transversely aligning a ferrule from said first connector part, when said first connector part is slidably engaged within said coupling part, with an opposing ferrule from said second connector part, when said second connector part is slidably engaged within said coupling part, said coupling part further comprising pivotally mounted latching members for securing said second connector part within said coupling part, said coupling part also including mounting members for attaching said coupling part to an axially perpendicular generally planar substrate.

12. A connector for high-density optical fiber interconnection, comprising:

(a) a first male connector body with a first end comprising a mounting structure for attachment of the first connector body to a generally planar substrate, a second end, and a first bore between the first and second ends, a first ferrule retaining member attached to said first body and positioned generally diametrically across said first bore, said first ferrule retaining member comprising a plurality of ferrule retention bores which are generally axially aligned with the first bore, a helical spring and a ferrule in each ferrule retention bore of the first ferrule retaining member, wherein each ferrule comprises a first end proximal the first end of the first body and a second end proximal the second end of the first body, and wherein each ferrule is free to axially and transversely move in the first ferrule retaining member independent of another ferrule therein;

(b) a second male connector body with a first end, a second end, and a second bore between the first end and the second end, wherein an external surface of the second connector body comprises at least one retention structure, a second ferrule retaining member attached to said second body and proximal the first end of said second connector body, wherein said ferrule retaining member is positioned generally diametrically across said second bore, said ferrule retaining member comprising a plurality of ferrule retention bores which are generally axially aligned with the second bore, a helical spring and a ferrule in each ferrule retention bore in the second ferrule retaining member, wherein each ferrule comprises a first end proximal the second end of the second body and a second end proximal the first end of the second body, wherein each ferrule is free to axially and transversely move in the second ferrule retaining member independent of another ferrule therein;

(c) a female coupling body with a first end that receives the second end of the first male connector body and frictionally engages the first male connector body, a second end that receives the first end of the second male connector body, and a coupling bore between the first end and the second end, said coupling body further comprising a ferrule coupling member generally diametrically across said coupling bore and attached to the coupling body, wherein said ferrule coupling member comprises a plurality of ferrule alignment bores generally axially aligned with the coupling bore and having a first end engaging the second end of the ferrules in the first male connector body and a second end engaging the second end of the ferrules in the second male connector body such that the second ends of the ferrules in the first male connector body abut the second ends of the ferrules in the second male connector body and provide optical interconnection therebetween, and a latching member pivotally mounted on said female coupling body, wherein said latching member releasably engages the at least one retention structure on the second male connector body.

13. A connector for high-density optical fiber interconnection, comprising:

(a) a first male connector body with a first end and a second end, and a first bore between the first and second ends, wherein the first male connector body is latched to a circuit board, a first ferrule retaining member attached to said first body and positioned generally diametrically across said first bore, said first ferrule retaining member comprising a plurality of ferrule retention bores which are generally axially aligned with the first bore, a helical spring and a ferrule in each ferrule retention bore of the first ferrule retaining member, wherein each ferrule comprises a first end proximal the first end of the first body and a second end proximal the second end of the first body, and wherein each ferrule is free to axially and transversely move in the first ferrule retaining member independent of another ferrule therein;

(b) a second male connector body with a first end, a second end, and a second bore between the first end and the second end, wherein an external surface of the second connector body comprises at least one retention structure, a second ferrule retaining member attached to said second body and proximal the first end of said second connector body, wherein said ferrule retaining member is positioned generally diametrically across said second bore, said ferrule retaining member comprising a plurality of ferrule retention bores which are generally axially aligned with the second bore, a helical spring and a ferrule in each ferrule retention bore in the second ferrule retaining member, wherein each ferrule comprises a first end proximal the second end of the second body and a second end proximal the first end of the second body, wherein each ferrule is free to axially and transversely move in the second ferrule retaining member independent of another ferrule therein;

(c) a female coupling body with a first end that receives the second end of the first male connector body and frictionally engages the first male connector body, a second end that receives the first end of the second male connector body, and a coupling bore between the first end and the second end, said coupling body further comprising a ferrule coupling member generally diametrically across said coupling bore and attached to the coupling body, wherein said ferrule coupling member comprises a plurality of ferrule alignment bores generally axially aligned with the coupling bore and having a first end engaging the second end of the ferrules in the first male connector body and a second end engaging the second end of the ferrules in the second male connector body such that the second ends of the ferrules in the first male connector body abut the second ends of the ferrules in the second male connector body and provide optical interconnection therebetween, and a latching member pivotally mounted on said female coupling body, wherein said latching member releasably engages the at least one retention structure on the second male connector body.

* * * * *